United States Patent
Carnell et al.

(10) Patent No.: US 9,633,488 B2
(45) Date of Patent: Apr. 25, 2017

(54) METHODS AND APPARATUS FOR ACQUIRING, TRANSMITTING, AND STORING VEHICLE PERFORMANCE INFORMATION

(71) Applicants: Jonathan Carnell, Greenville, SC (US); Chase Siuta, Greenville, SC (US)

(72) Inventors: Jonathan Carnell, Greenville, SC (US); Chase Siuta, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/775,973

(22) PCT Filed: Mar. 14, 2014

(86) PCT No.: PCT/US2014/028738
§ 371 (c)(1),
(2) Date: Sep. 14, 2015

(87) PCT Pub. No.: WO2014/144361
PCT Pub. Date: Sep. 18, 2014

(65) Prior Publication Data
US 2016/0031449 A1 Feb. 4, 2016

Related U.S. Application Data

(63) Continuation-in-part of application No. PCT/US2013/032150, filed on Mar. 15, 2013.

(51) Int. Cl.
*G07C 5/02* (2006.01)
*H04W 4/00* (2009.01)
(Continued)

(52) U.S. Cl.
CPC .............. *G07C 5/02* (2013.01); *G07C 5/008* (2013.01); *G07C 5/0825* (2013.01); *H04W 4/00* (2013.01); *H04W 4/046* (2013.01)

(58) Field of Classification Search
CPC ........ G07C 5/02; G07C 5/008; G07C 5/0825; H04W 4/046; H04W 4/00
(Continued)

(56) References Cited

U.S. PATENT DOCUMENTS

| 8,352,118 B1 * | 1/2013 | Mittelsteadt | G07C 5/008 340/438 |
|---|---|---|---|
| 8,421,864 B2 | 4/2013 | Tano | |

(Continued)

FOREIGN PATENT DOCUMENTS

| JP | 2005025777 A | 1/2005 |
|---|---|---|
| JP | 2006112127 A | 4/2006 |

(Continued)

OTHER PUBLICATIONS

PCT/US2014/028738 International Search Report and Written Opinion dated Aug. 21, 2014, 13 pages.

*Primary Examiner* — Tan Q Nguyen
(74) *Attorney, Agent, or Firm* — Hahn Loeser & Parks LLP; Bret A. Hrivnak, Esq.

(57) ABSTRACT

The present invention includes the methods and the apparatus for acquiring, transmitting, and storing vehicle performance information. The methods of the present invention can be embodied in a wireless mobile computer device or non-transitory computer-readable medium. The embodiments include a processor, a memory storage device, a display screen, and a software application. The software application includes computer-readable instructions stored on the memory storage device and configured for execution by this process. These computer-readable instructions fur-
(Continued)

ther include steps for acquiring instructions, storing instructions, displaying instructions, and transmitting instructions.

17 Claims, 4 Drawing Sheets

(51) Int. Cl.
*G07C 5/08* (2006.01)
*G07C 5/00* (2006.01)
*H04W 4/04* (2009.01)

(58) Field of Classification Search
USPC ............ 701/33, 33.2, 33.3, 33.4, 32.7, 469; 705/4; 340/438
See application file for complete search history.

(56) References Cited

U.S. PATENT DOCUMENTS

| | | | |
|---|---|---|---|
| 8,924,240 B2 * | 12/2014 | Depura | H04W 52/0258 701/469 |
| 2009/0143079 A1 | 6/2009 | Klassen et al. | |
| 2010/0131304 A1 * | 5/2010 | Collopy | G06Q 30/0224 705/4 |
| 2011/0153367 A1 * | 6/2011 | Amigo | G07C 5/008 705/4 |
| 2011/0307188 A1 * | 12/2011 | Peng | G06Q 10/0639 702/33 |
| 2012/0029764 A1 | 2/2012 | Payne et al. | |
| 2012/0258668 A1 | 10/2012 | Rokusek et al. | |
| 2013/0006675 A1 | 1/2013 | Bowne et al. | |
| 2013/0046510 A1 | 2/2013 | Bowne et al. | |
| 2013/0046562 A1 * | 2/2013 | Taylor | G06Q 40/00 705/4 |
| 2014/0073254 A1 | 3/2014 | Ichihara et al. | |

FOREIGN PATENT DOCUMENTS

| | | |
|---|---|---|
| JP | 2008102762 A | 5/2008 |
| JP | 2011076322 A | 4/2011 |
| JP | 2012174102 A | 9/2012 |
| JP | 2012185537 A | 9/2012 |
| JP | 2013003887 A | 1/2013 |
| WO | 2012160668 A1 | 11/2012 |

* cited by examiner

METHODS AND APPARATUS FOR ACQUIRING, TRANSMITTING, AND STORING VEHICLE PERFORMANCE INFORMATION

This application is a National Stage application of International Application No. PCT/US2014/028738, filed Mar. 14, 2014, and claims priority to, and the benefit of, International Patent Application No. PCT/US2013/032150, filed Mar. 15, 2013 with the US Receiving Office, which is hereby incorporated by reference.

BACKGROUND OF THE INVENTION

This invention relates generally to wireless mobile computing devices, and more specifically, the acquisition, transmission, and storage of vehicle performance information.

DESCRIPTION OF THE RELATED ART

Obtaining vehicle performance information can be useful for a variety of purposes. Presently, devices exist for obtaining certain vehicle performance information. Such devices, however, without use of additional devices, are unable to display the information in real-time to a nearby user or to transmit such information to a remote memory storage device, such as a remote server or cloud storage, for concurrent or later use by another. Furthermore, such devices are unable to capture and transmit images, such as photographs, repeatedly while concurrently acquiring the vehicle performance information for transmission to the remote memory storage device.

Therefore, there is a need to provide an improved manner of acquiring vehicle performance information, as well as related images, while also transmitting the vehicle information for remote storage and use by another, such as for the purpose of evaluating vehicle handling performance.

SUMMARY OF THE INVENTION

The present invention includes the methods and the apparatus for acquiring, transmitting, and storing vehicle performance information. A particular embodiment of the present invention includes a method implemented by a software application on a wireless mobile computing device for acquiring vehicle performance data and related information. Such method includes the step of acquiring vehicle performance data during the operation of a vehicle using a wireless mobile computing device removably mounted to the vehicle. This vehicle performance data includes any desired information useful for evaluating the performance of the vehicle. Such method further includes storing the vehicle performance data acquired in the preceding step on a memory storage device. A further step includes displaying a representation of the vehicle performance data on a display screen of the wireless mobile computing device. In a further step the vehicle performance data may be transmitted automatically and/or wirelessly to a remote memory storage device.

A particular embodiment of the present invention includes a wireless mobile computing device having the capabilities for acquiring the vehicle performance data and related information. This mobile device includes a processor, a memory storage device in operable communication with the processor, a display screen, and a software application. The software application includes computer-readable instructions stored on the memory storage device and configured for execution by this process. The software application instructions includes the step of acquiring instructions for acquiring the vehicle performance data during operation of a vehicle. This vehicle performance data is acquired using a wireless mobile computing device removably mounted to the vehicle. Such vehicle performance data includes any desired information useful for evaluating the performance of the vehicle. The software application instruction further includes the steps of storing instructions for storing the vehicle performance data acquired in the preceding step on a memory storage device, displaying instructions for displaying a representation of the vehicle performance data on a display screen of the wireless mobile computing device, and transmitting instructions for transmitting automatically the vehicle performance data wirelessly to a remote memory storage device after the vehicle has travelled a minimum distance during vehicle operation.

A particular embodiment of the present invention includes a non-transitory computer-readable medium having computer-executable instructions recorded thereon. The computer-readable instructions are capable of being executed by a processing element of a mobile device and providing capabilities for acquiring vehicle performance data and related information using the mobile device. The computer-executable instructions includes the step acquiring instructions for acquiring vehicle performance data during operation of a vehicle using a wireless mobile computing device removably mounted to the vehicle. Again, this vehicle performance data includes any desired information useful for evaluating the performance of the vehicle. The computer-executable instructions further include the steps of storing instructions for storing the vehicle performance data acquired above on a memory storage device, displaying instructions for displaying a representation of the vehicle performance data on a display screen of the wireless mobile computing device, and transmitting instructions for transmitting automatically the vehicle performance data wirelessly to a remote memory storage device after the vehicle has travelled a minimum distance during vehicle operation.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Figure 1:
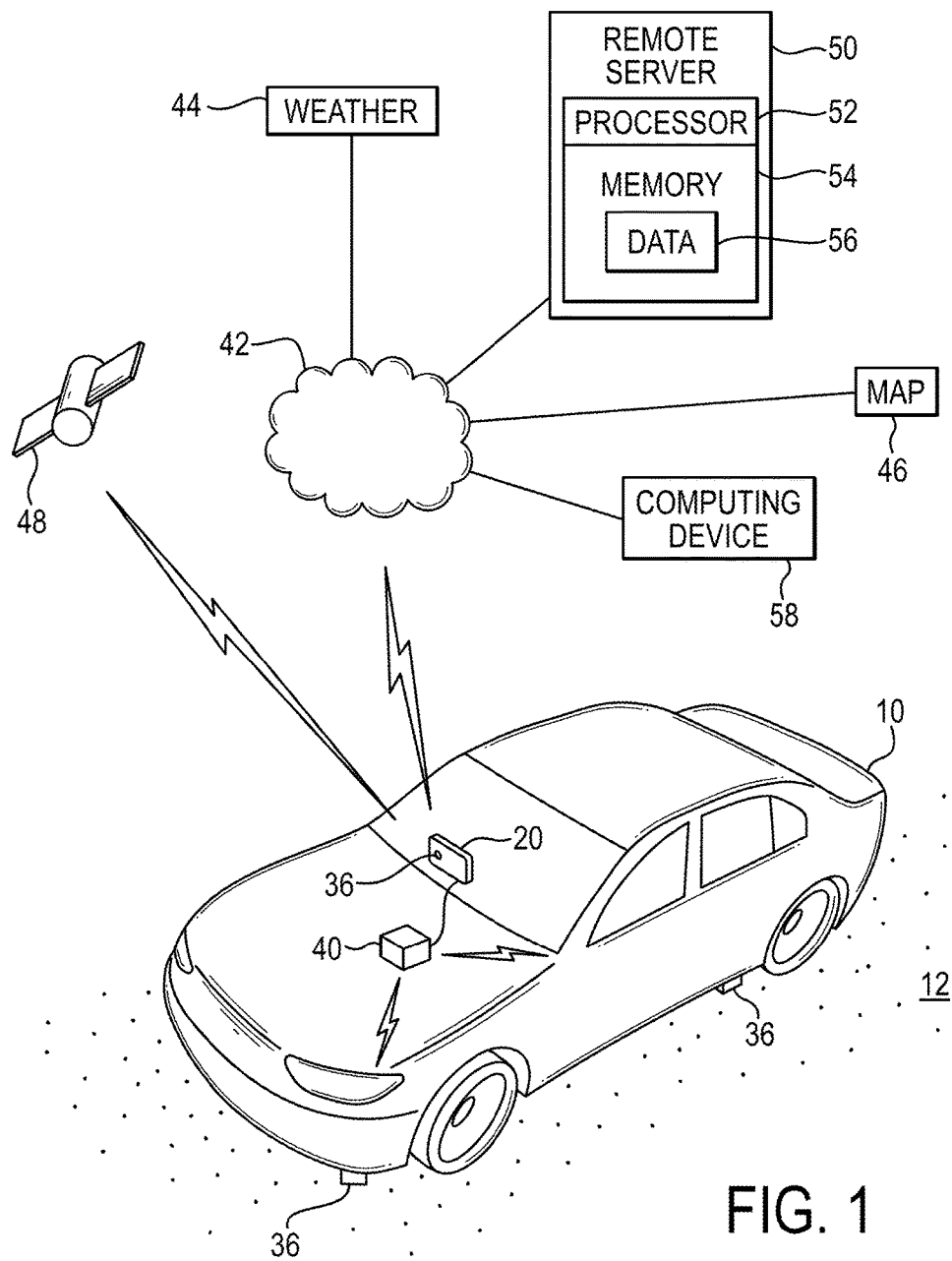
FIG. 1 is a perspective view showing a wireless mobile computing device operably attached to a vehicle comprising an automobile, the wireless mobile computing device being in operable communication with other devices to provide a system for acquiring, transmitting, and storing vehicle performance information in accordance with an exemplary embodiment of the invention.

The present invention comprises improved methods and apparatus for acquiring, transmitting, and storing vehicle performance information, which may be concurrently or later used by another to evaluate the performance of the vehicle. Prior methods and apparatus do not provide concurrent or real-time display of the vehicle performance information to a user in or operating the vehicle as well as automatic transmission and storage of such information to a remote memory storage device for concurrent or real-time or later use by another.

The present invention involves the use of a wireless computing mobile device to acquire various vehicle performance information, in the form of data, and to transfer the data in a by way of wireless transmission to a remote memory storage device, where the data is stored for concurrent and/or later use by a user. The vehicle performance data may then be evaluated and analyzed to better ascertain the performance of the vehicle, such as vehicle handling and maneuverability. Separately or concurrently, the acquired vehicle performance information may also be delivered in the form of data to a display screen for viewing by a user in the vehicle to which the data pertains. Accordingly, the present invention includes a method implemented by a software application on a wireless mobile computing device for acquiring vehicle performance information. Furthermore, in other embodiments, the present invention comprises a wireless mobile computing device including the software application, or the software application itself.

Software application or software as used herein includes, but is not limited to, one or more computer-readable and/or executable instructions that cause a computing device to perform operations, functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment in which it operates, and/or the desires of a designer/programmer or the like.

The term "computing device" as used herein refers to any device including a processor and memory storage device such that the computing device is configured to process, execute, and perform computer-executable instructions. Each of the processor and the memory storage device may comprise any such device as further described herein.

The term "communication device" as used herein refers to any device configured to transmit and/or receive data (which more generally represents information) by wired or wireless transmission. A communication device therefore includes a processor, a memory storage device, and a data transmission device configured to transmit data (i.e., to communicate data or send and/or receive data) between another communication device through any digital or analog network. While not necessary, a communication device may also communicate through a cellular network to provide phone capabilities. By example, a communication device includes, without limitation, a personal computer, a tablet computer, a personal digital assistant (PDA), a handheld cellular mobile phone, a smartphone, and a server computer. The term wireless mobile computing device as used herein refers to any communication device configured to execute software applications and communicate data wirelessly. While a wireless mobile computing device is configured to transmit data wirelessly, it may (or may not) also be configured to transmit data by wired connection. It is understood that a communication device may employ any desired operating system. For example, any known mobile operating system may be employed, which includes, without limitation, iOS, Android, Windows Mobile, and Palm webOS.

It is understood that data transmission may occur in cooperation with any communication infrastructure, which herein refers to any or all of the systems involved in providing the communication of information between two or more devices. By example, communication infrastructure includes, without limitation, a cellular telephone system, the internet, a satellite communication system, wide area network (WAN), local area network (LAN), wireless local area network (WLAN), virtual network, or telecommunications network.

A processor includes, but is not limited to, any programmed or programmable electronic device that can store, retrieve, and process data. Data comprises any digital or analog representation of information, which may be transmitted wirelessly or by wired connection and stored on a memory storage device. A memory storage device comprises any known device configured to store processor-executable instructions and/or data, such as inputs and/or outputs, which can be retrieved by a processer. For example, a memory storage device may comprise, without limitation, random access memory (RAM), read-only memory (ROM), or programmable read-only memory (PROM), an erasable programmable read-only memory (EPROM), an electrically erasable read-only memory (EEPROM).

A memory storage device may comprise a non-transitory computer-readable medium, which does not include transitory propagating signals (e.g., a propagating electromagnetic wave carrying information on a transmission medium such as space or a cable). A non-transitory computer-readable medium is configured to store a software application, including computer-executable instructions, as well as any other data, such as input and/or output. For example, a non-transitory computer-readable medium may comprise, without limitation: any magnetic storage device (e.g., hard disk, floppy disk, tape, or drum); any optical storage medium (e.g., CD/DVD or CD-ROM); any magneto-optical storage medium; any holographic device (e.g.; an optical disk); and any hardware device configured to store and execute computer-executable instructions.

Communication devices may further include a display screen for displaying input and/or output data of a software application, and a user interface for communicating input data and/or instructions for use by the software application. The term display screen as used herein is a device operatively configured to display information directed by the software application. The display screen may include, for example, a liquid crystal display (LCD) screen or a light-emitting diode (LED) display screen. The term "user interface" as used herein refers to any and all types of hardware and/or software that allow a user to interact with a device (e.g., a keypad, a keyboard, a touch-screen, a computer mouse, a voice-activated system). In instances where the user interface comprises of a display screen, or is used in cooperation with the display screen, a data field or user prompt may be provided for the user to communicate data and/or instructions for execution.

Figure 2:
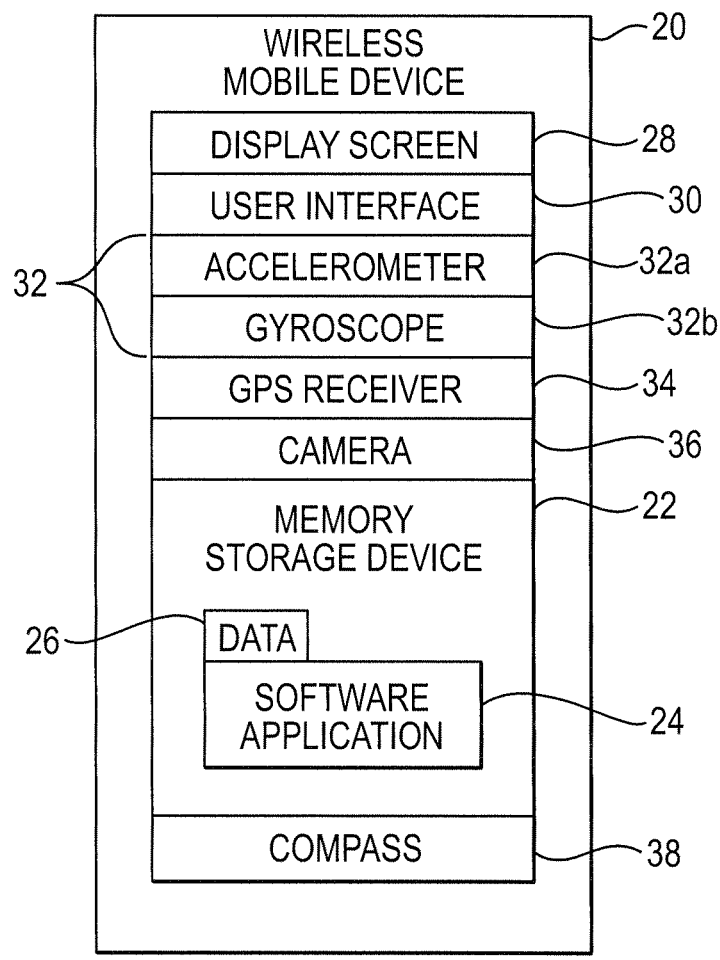
FIG. 2 is a diagrammatical view of the wireless mobile computing device of FIG. 1 comprising a device for acquiring, transmitting, and storing vehicle performance information in accordance with an exemplary embodiment of the invention.
Figure 3:
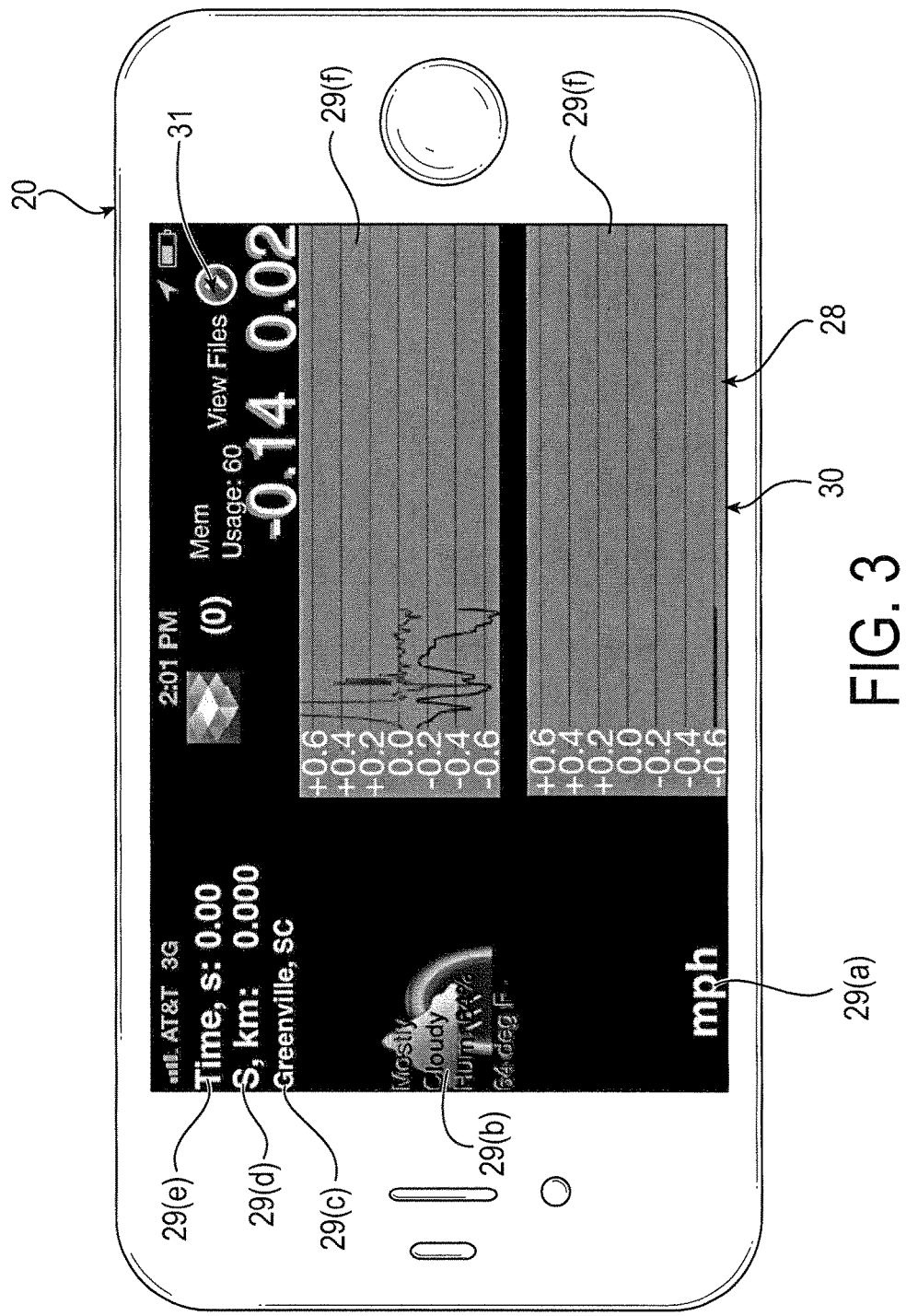
FIG. 3 is a front perspective view of the wireless mobile computing device of FIG. 1 having a screen display displaying various representations of the vehicle performance data acquired in accordance with an embodiment of the invention.

In an exemplary embodiment of the invention in FIG. 1, a wireless mobile computing device 20 is shown performing various steps of certain methods discussed herein. In FIG. 2, a closer view of the device 20 is shown to include a display screen 28, a user interface 30 comprising a touch screen, and a memory storage device 22. The memory storage device includes a software application and vehicle performance data 26 acquired and stored according the methods discussed herein and shown in FIG. 4.

Figure 4:
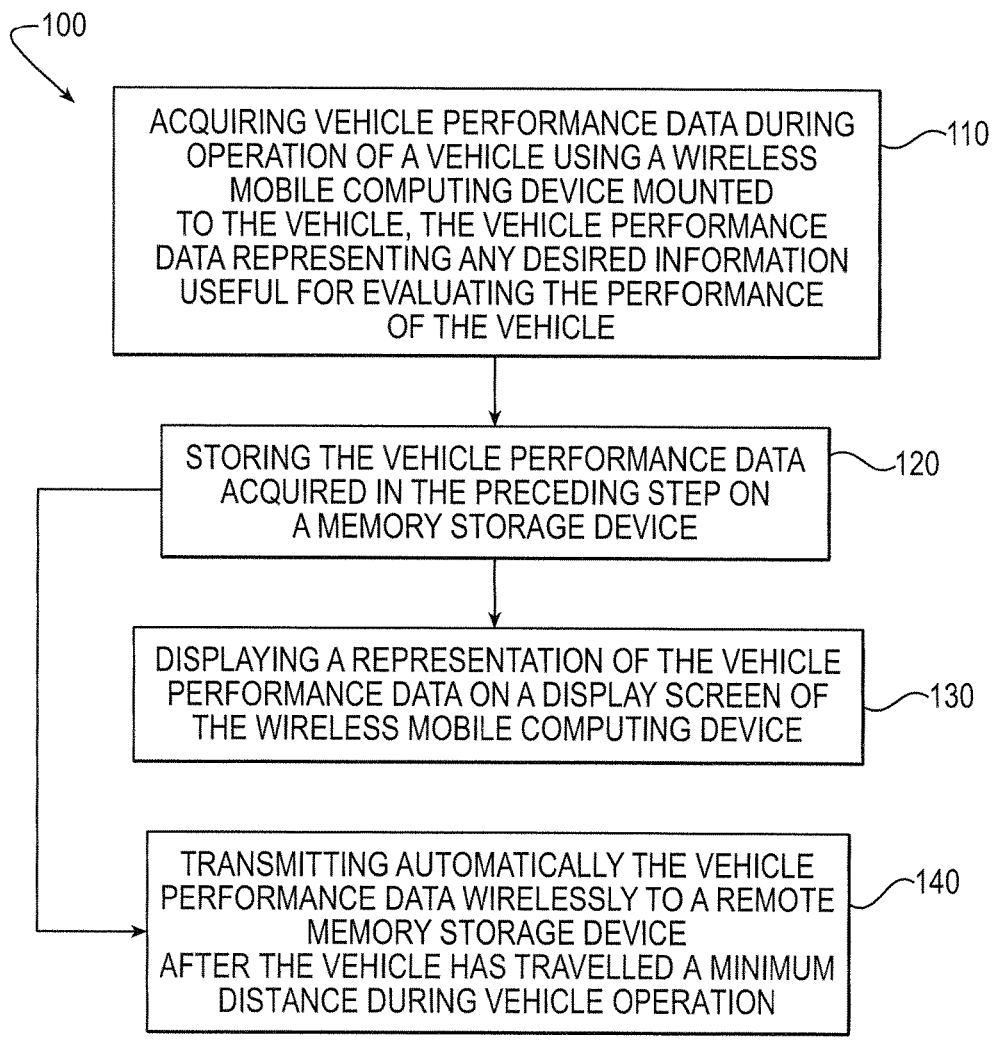
FIG. 4. Is a flow chart representing a method implemented by a software application on the wireless mobile computing device of FIG. 1.

Particular embodiments of the inventive methods will now be discussed in association with the wireless mobile computing device. In particular instances, the methods are discussed in association with an exemplary system shown in FIGS. 1-4, where FIG. 4 represents an exemplary method 100 being employed and implemented by the wireless mobile computing device.

In particular embodiments, a method implemented by a software application on a wireless mobile computing device for acquiring vehicle performance information comprises a step of acquiring vehicle performance data during operation of a vehicle using a wireless mobile computing device operably mounted, such as being removably or fixedly mounted, for example, to the vehicle, the vehicle performance data representing any desired information useful for evaluating the performance of the vehicle. Such step is referenced as 110 in the method outlined in FIG. 4. Vehicle performance data may capture, describe, or measure any information useful for evaluating the performance of the vehicle. For example, such information may relate to engine performance, such as engine temperature, revolutions per minute (rpm), air intake temperature, exhaust temperature, and fuel consumption. By further example, such information may comprise any driver input, such as steering, throttle, and braking inputs. Still further, by example, such information may comprise: vehicle speed; vehicle acceleration (which includes deceleration); yaw, pitch, and/or roll arrangement or the rate thereof; vehicle location; and driving condition information, such as road condition information (e.g., images showing the road surface to evidence type and condition) and weather information (e.g., air temperature, precipitation, wind speed, sunny/overcast/cloudy). It is understood that the vehicle may comprise any vehicle, including, without limitation, an automobile (e.g., car, van, truck, or semi-truck), a motorcycle, a tractor, or a heavy-duty vehicle (e.g., earthmover). With reference to an exemplary embodiment in FIG. 1, a smartphone 20 is shown mounted to car 10.

It is understood that the vehicle performance data may be obtained using any one or more tools or features (or functionalities) contained on the wireless mobile computing device. With reference to the exemplary embodiment of FIG. 2, the wireless mobile computing device 20 of FIG. 1 is shown to include numerous tools or features, which include motion sensors 32 comprising an accelerometer 32a and a gyroscope 32b. Furthermore, device 20 include a global positioning system (GPS) receiver 34, a camera 36, and a compass 38. It is understood that any combination of these or other tools or features may be employed by the device 20. Additionally, or in the alternative, vehicle performance data may be obtained from a data acquisition device mounted on the vehicle remote from the wireless mobile computing device. With reference to the exemplary embodiment of FIG. 1, a data acquisition device 20 is shown mounted to the vehicle 10 remotely from the wireless mobile computing device 20. A wired connection is shown, although it is understood that wireless communication may be employed in the alternative.

In particular embodiments, the wireless mobile computing device is configured to obtain and track the movement and/or location of the device, and therefore, the movement and/or location of the vehicle. Accordingly, vehicle performance data may include movement data and/or location data (each of which is also respectively referred to herein as "vehicle movement data" and "vehicle location data"). Movement data not only includes tracking the path of the wireless mobile computing device or vehicle, movement data may also include vehicle velocity data and/or vehicle acceleration data.

In particular embodiments, a wireless mobile computing device includes one or more motion sensors to obtain vehicle performance data comprising motion data. A motion sensor may comprise an accelerometer or a gyroscope. In wireless mobile computing devices, motion sensors may comprise micro electro-mechanical systems (MEMS). In certain instances, a wireless mobile computing device includes both an accelerometer and a gyroscope. Motion sensors operation in cooperation with the processor and memory storage device of the communication device, as well as with a corresponding software application, to obtain movement data.

An accelerometer sensor is used to measure the linear acceleration (change in velocity) of the communication device as well as the amount of tilt of the communication device. These measurements may occur in one or more directions using one or more accelerometers. Accordingly, the accelerometer can ascertain the acceleration and orientation of the communication device in any direction.

In particular embodiments, the wireless mobile computing device includes one or more gyroscopes to obtain movement data of the phone and vehicle. Each gyroscope is configured to measure the angular rate of motion about one or more axes, and up to three axes. For example, a gyroscope may comprise a yaw-rate sensor configured to measure the angular velocity (i.e., the yaw-rate) of vehicle as the vehicle rotates about a vertical axis. The yaw-rate measurement is obtained in cooperation with the processor and stored as yaw-rate data (which is a subset of movement data). The yaw-rate can be useful for determining the slip angle of the vehicle (where the slip angle is generally the angle between the direction the vehicle is heading and direction of vehicle movement. Each of the one or more gyroscopes may also measure the pitch-rate and the roll-rate of the vehicle. Pitch refers to the angular velocity (i.e., the pitch-rate) of vehicle as the vehicle rotates about a lateral axis—such as when the vehicle tilts from front-to-back. Roll refers to the angular velocity (i.e., the roll-rate) of vehicle as the vehicle rotates about a longitudinal axis—such as when the vehicle tilts from side-to-side. Pitch-rate measurements are obtained and stored in cooperation with the wireless mobile computing device processor as pitch-rate data, while roll-rate measurements are obtained and stored as roll-rate data.

In particular embodiments, movement and/or location data may be obtained using a global positioning system (GPS), which provide global position data. In doing so, the wireless mobile computing device includes a GPS receiver operatively configured to provide GPS location information to the processor in cooperation with one or more GPS satellites. In obtaining movement data, not only is the GPS configured, in cooperation with the processor, to track the movement or path of the device and vehicle, the GPS may also be used to determine and obtain the velocity and/or acceleration of the phone and vehicle. Therefore, movement data obtained by the GPS may include vehicle velocity data and/or vehicle acceleration data. With reference to the exemplary embodiment of FIG. 1, a wireless mobile computing device 20 is shown in wireless communication with a GPS satellite 48.

In further embodiments, movement data may be obtained using an inertial navigation system (INS) contained within the wireless mobile computing device, where through the use of one or more accelerometer sensors in cooperation with the processor, the communication device is configured to obtain and track up to three-dimensional movement of the vehicle. In certain instances, this capability may include the use of the gyroscope in combination with the one or more accelerometers.

In further embodiments, the wireless mobile computing device includes a magnetic sensor or a compass integrated circuit (referred to herein as "compass") arranged in cooperation with the processor to obtain directional data of the vehicle. For example, a magnetic sensor may comprise a magnetometer or a magnetoresistive (AMR) sensor, which measure the earth's magnetic field.

It is understood that at least one or a plurality of vehicle performance data may be obtained concurrently from any one or more tools or features of the wireless mobile computing device. As noted above, additionally or in the alternative, vehicle performance data may be received from a remote source.

For example, in particular embodiments vehicle performance data may be alternatively or additionally obtained from a data acquisition device arranged on the vehicle and remotely from the wireless mobile computing device. The data acquisition device may comprise one or more sensors operably arranged to acquire desired vehicle performance data, the one or more sensors being in operable communication with a transmission device to communicate vehicle performance data wirelessly or by wired connection to the wireless mobile computing device. Wireless transmission may be achieved by any communication infrastructure, such as by Bluetooth®, Wi-Fi, or radio communication. Wired connection may occur by way of any data connectivity port of the wireless mobile computing device. The data acquisition device may also include a processor and a memory storage device for the purpose of obtaining, storing, and transmitting vehicle performance data.

In particular embodiments, the data acquisition device is an on-board diagnostic (OBD) system for acquiring particular vehicle performance data. For example, an OBD system may acquire data from the engine control unit (ECU), where such data includes without limitation: revolutions per minute (rpm) of the vehicle engine; the temperature of the intake air of the engine; fuel consumption; percent throttle; and vehicle speed. With reference to the exemplary embodiment of FIG. 1, a remote data acquisition source 40 comprising an OBD system is shown to be in wired communication with wireless mobile computing device 20.

Additionally, or in the alternative, vehicle performance data may be acquired by a data acquisition device comprising one or more cameras arranged along the vehicle, which obtains image data representing the captured image. For example, in particular embodiments, one or more cameras may be arranged along an underside of the vehicle to capture images of the operating surface upon which the vehicle operations. Additionally, or in the alternative, a camera contained within the wireless mobile computing device comprises the one or more cameras arranged along the vehicle. In such instances, the camera contained within the wireless mobile computing device may be employed to selectively capture any desired images. For example, a user may capture desired images manually of the vehicle, the ambient or geographical conditions, or of the vehicle operating surface before, during, or after vehicle operation. By further example, camera contained within the wireless mobile computing device may capture images through the windshield of the driving conditions, such as when the wireless mobile computing device is mounted on a vehicle dashboard. With reference to the exemplary embodiment of FIG. 1, cameras 36 are shown to be arranged within the wireless mobile computing device 20 and along the underside of the vehicle for capturing images of the vehicle operating surface 12. The cameras arranged along the underside of the vehicle are shown to be in wireless communication with the data acquisition device 40.

Additionally, or in the alternative, data may additionally or alternatively be directly acquired from a data acquisition device comprising one or more sensors arranged along the vehicle, or from a telemetry system (similar to the OBD system) that collects data from one or more other sensors arranged along the vehicle, which may measure steering inputs, suspension movements, and wheel loads, for example.

It is also understood that, in particular embodiments, the wireless mobile computing device may obtain vehicle performance data from a remote data source comprising a remote memory storage device, such as a web-hosted server or server computer. Data obtained may comprise, for example, weather data representing weather information pertaining to the locale where the vehicle is operating, geographical information pertaining to the course or road along which the vehicle is operating (e.g., a road or course map or a topographical map). With reference to the exemplary embodiment of FIG. 1, remote data sources 44 and 46 (e.g., a weather website and a map website, respectively) are in communication with wireless mobile computing device 20 by way of communication infrastructure 42 (e.g., the internet).

It is understood that the step of acquiring may be performed in real-time or near real-time as the data is being generated during vehicle operation. Accordingly, whether the data is being acquired from any tool or feature on the wireless mobile computing device or from a remote source, such as a data acquisition device or from a remote server computer, in particular embodiments, the vehicle performance data is acquired in real-time or near real-time. When the vehicle performance data is being transmitted from a remote source, the vehicle performance data is also being transmitted from the remote source in real-time or near real-time. By transmitting the data in real-time, the data is being transmitted to the wireless mobile computing device concurrently as the data is being acquired by the remote source, and where the wireless mobile computing device immediately receives and stores the data transmitted upon receipt. The term "real-time" as used herein, means that a device performing an operation (such as acquiring, storing, and/or transmitting) responds as rapidly as possible based upon the capabilities of the device employed. Accordingly, real-time operations may endure for a several seconds to as low as milli-seconds or micro-seconds.

The inventive methods further include a step of storing the vehicle performance data acquired in the preceding step on a memory storage device. Such step is referenced as 120 in the method outlined in FIG. 4. Upon acquiring the vehicle performance data, the data is stored in digital or analog form on a memory storage device for concurrent or subsequent use. In particular embodiments, the memory storage device forms a component of the wireless mobile computing device, although additionally, or in alternative embodiments, a memory storage device remote to the wireless mobile computing device may be employed. As suggested above, in particular embodiments, the step of storing may be performed in real-time upon receipt of the vehicle performance data in the preceding step. With reference to the exemplary embodiment of FIG. 2, the wireless mobile computing device 20 includes vehicle performance data 26 stored on the memory storage device 22 previously acquired in the prior step of acquiring.

Particular embodiments of the inventive methods include the step of displaying a representation of the vehicle performance data on a display screen of the wireless mobile computing device. Such step is referenced as 130 in the method outlined in FIG. 4. Implementation this step of displaying may be performed automatically, such as according to preselected instructions or preferences received from a user by way of the user interface, for example. As suggested above, in particular embodiments, the step of displaying may be performed in real-time upon receipt of the vehicle performance data or upon the data being stored according any preceding step. It is understood that the data may be displayed in raw form (in a text file, for example), or the data may be displayed in a pre-arranged or pre-designed ordered representation, where at least a selected portion of the data is displayed. It is understood that the representation may include functionality allowing a user to select different data to be displayed in any desired arrangement. Because vehicle performance data may include images taken by a camera, one or more images acquired from the camera may be displayed. With reference to the exemplary embodiment of FIG. 3, the wireless mobile computing device 20 of FIG. 2, having acquired and stored vehicle performance data according to previous step of the method, is shown to include a display screen 28, a user interface 30 comprising a touch screen, and a memory storage device 22. The display screen shows digital representations 29 of the vehicle performance data acquired and stored in prior steps. Examples of such digital representations are identified as representation of speed data 29(a), weather data 29(b), location data 29(c), acceleration data 29(d), time data 29(e), and graphic data 29(f). The data 29(f) representations are numeric data measured by tools or features of the wireless mobile computing device and/or by the on-board diagnostic (OBD) or any other remote data source. The digital representation shown in FIG. 3 also include user prompts 31, which requests input or selection of any data or instructions for performance and execution by the wireless mobile computing device.

In particular embodiments, the inventive methods include the step of transmitting automatically the vehicle performance data wirelessly to a remote memory storage device. In particular embodiments, the step of transmitting is performed after the vehicle has travelled a minimum distance during vehicle operation. Such step is referenced as 140 in the method outlined in FIG. 4. It is appreciated that a minimum distance may be any distance sufficient to obtain a sufficient amount of vehicle performance data. In particular examples, the minimum distance is at least 50 miles or at least 100 miles. In particular embodiments, the step of transmitting is performed when vehicle operation has stopped, that is, when the vehicle has stopped moving (that is, stopped translating or travelling) and is at rest, which may occur, for example, when additional data vehicle performance data is to be later acquired and stored according to the methods discussed herein after the step of transmitting is performed. In certain instances, the step of transmitting is performed upon a first occurrence of the vehicle stopping (that is, when the vehicle first comes to rest or ceases travel) after reaching or surpassing the minimum distance. In other variations, it is understood that acquisition of vehicle performance data may be terminated while the vehicle is in operation, that is, when moving (that is, translating or travelling). In such instances, the step of transmitting may be performed when the vehicle is at rest or while the vehicle is moving and not at rest. In particular variations, the steps of acquiring and storing are again performed after the step of transmitting is performed for later transmitting when again performing the step of transmitting after reaching a minimum distance, which may be a different or the same minimum distance as used in performing the prior step of transmitting. With regard to any step of transmitting, it is understood that while the data may remain on the memory storage device—even when additional data acquisition and storage resumes, in certain instances the data transmitted in the step of transmitting is removed from the storage device so to provide additional memory storage capacity, such as to maintain or increase RAM for improved processing or computing speed, for example. In an alternative embodiment, upon acquiring any vehicle performance data according to the step of transmitting, or upon storing the data according to the step of storing, in certain embodiments the step of transmitting is automatically performed in real-time. It is understood that performing the step of transmitting automatically may be performed according to preselected instructions or preferences received from a user by way of the user interface. Accordingly, in particular embodiments, the step of transmitting automatically occurs after instructing the wireless mobile computing device to transmitting automatically the vehicle performance data wirelessly to the remote memory storage device. Otherwise, it is understood in certain other embodiments, the transmission of the vehicle performance data may occur manually, such as upon receipt of instructions from a user (e.g., by way of a user interface), which may occur after the software application prompts the user for instructions (e.g., by way of the screen display). Transmission occurs using any known communication infrastructure. Likewise, a remote memory storage device may comprise any known memory storage device remote from the wireless mobile computing device and the vehicle. For example, in particular embodiments, vehicle performance data is transmitted via wireless transmission from the wireless mobile computing device using known communication infrastructure to a remote memory device comprising a web-hosted sever or server computer, such as a cloud storage device. With reference to the exemplary embodiment of FIG. 1, the wireless mobile computing device 20 is shown transmitting vehicle performance data 26 to a remote memory storage device, comprising a cloud server, the transmission occurring by way of communication infrastructure 42.

Upon receipt, a user may access the remote memory storage device in real-time or at some time later to review, evaluate, analyze, and even manipulate the vehicle performance data using a software application to better ascertain the performance of the vehicle during vehicle operation. Accordingly, in particular embodiments, such methods may further include the step of: accessing the vehicle performance data stored on the remote memory storage device using a computing device; and, evaluating the vehicle performance data to evaluate performance of the vehicle during vehicle operation. For example, the data may be employed to determine vehicle handling and maneuverability, and/or to ascertain lap times and/or split times along a particular course. With reference to the exemplary embodiment of FIG. 1, a computing device 58 is shown to be in communication with the remote memory storage device 50 for the purpose of accessing and evaluating the vehicle performance data 26.

In particular embodiments of the methods contemplated, each of or any combination of the steps of acquiring, storing, and transmitting automatically the vehicle performance data, in accordance with any embodiment thereof, are repeatedly performed at regular, predefined intervals or even continuously. For example, vehicle performance data may be acquired, stored, and/or transmitted at intervals of 20 hertz or less. This facilitates a consistent assembly of data for evaluation and analysis. Additionally, or separately, any step of displaying may also be repeatedly performed at regular, predefined intervals or even continuously. It is also understood that each of or any combination of the steps of acquiring, storing, displaying, and transmitting automatically the vehicle performance data, in accordance with any embodiment thereof, are performed concurrently, which may or may not be in real-time.

It is also understood that particular embodiments of the invention comprise a wireless mobile computing device having capabilities for acquiring vehicle performance data and related information as discussed above. In particular embodiments, however, the mobile device includes (1) a processor; (2) a memory storage device in operable communication with the processor; (3) a display screen; and, (4) a software application comprising computer-readable instructions stored on the memory storage device and configured for execution by said processor, the software application instructions comprising instructions for performing any method step discussed above or otherwise contemplated herein. For example, in particular embodiments, the instructions at least include: acquiring instructions for acquiring vehicle performance data during operation of a vehicle using the wireless mobile computing device operably mounted to the vehicle, the vehicle performance data representing any desired information useful for evaluating the performance of the vehicle; storing instructions for storing the vehicle performance data acquired in the preceding step on a memory storage device; displaying instructions for displaying a representation of the vehicle performance data on a display screen of the wireless mobile computing device; and, transmitting instructions for transmitting automatically the vehicle performance data wirelessly to a remote memory storage device.

It is also understood that particular embodiments of the invention comprise a non-transitory computer-readable medium having computer-executable instructions recorded thereon, said computer-readable instructions capable of being executed by a processing element of a mobile device and providing capabilities for acquiring vehicle performance data and related information using the mobile device. For example, in particular embodiments, the instructions at least include: acquiring instructions for acquiring vehicle performance data during operation of a vehicle using a wireless mobile computing device operably mounted to the vehicle, the vehicle performance data representing any desired information useful for evaluating the performance of the vehicle; storing instructions for storing the vehicle performance data acquired in the preceding step on a memory storage device; displaying instructions for displaying a representation of the vehicle performance data on a display screen of the wireless mobile computing device; and, transmitting instructions for transmitting automatically the vehicle performance data wirelessly to a remote memory storage device.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A method implemented by a software application on a wireless mobile computing device for acquiring vehicle performance data and related information, the method comprising:
   acquiring vehicle performance data during operation of a vehicle using a wireless mobile computing device operably mounted to the vehicle, the vehicle performance data representing any desired information useful for evaluating the performance of the vehicle, where the vehicle performance data includes image data that represents an image of an operating surface upon which the vehicle operates, where the step of acquiring vehicle performance data includes capturing the image data from a camera mounted to the vehicle;
   storing the vehicle performance data acquired in the preceding step on a memory storage device;
   displaying a representation of the vehicle performance data on a display screen of the wireless mobile computing device;
   transmitting automatically the vehicle performance data wirelessly to a remote memory storage device after the vehicle has travelled a minimum distance during vehicle operation.

2. The method of claim 1, where transmitting automatically occurs after instructing the wireless mobile computing device to transmitting automatically the vehicle performance data wirelessly to the remote memory storage device.

3. The method of claim 1, where acquiring, storing, and transmitting automatically the vehicle performance data are repeatedly performed at regular, predefined intervals.

4. The method of claim 1, where acquiring, storing, and transmitting automatically the vehicle performance data are repeatedly performed at regular, predefined intervals.

5. The method of claim 1, where the vehicle performance data includes movement data.

6. The method of claim 1, where acquiring vehicle performance data includes acquiring data generated by at least one of an accelerometer and a gyroscope of the mobile device.

7. The method of claim 1, where the vehicle performance data includes location data.

8. The method of claim 7, where the location data comprises global position data the geographical location of the vehicle using a global positioning system receiver of the mobile device.

9. The method of claim 7, where acquiring, storing, and transmitting automatically the vehicle performance data are repeatedly performed at regular, predefined intervals.

10. The method of claim 1, where the vehicle performance data includes weather data.

11. The method of claim 1 further comprising:
    accessing the vehicle performance data stored on the remote memory storage device using a computing device; and,
    evaluating the vehicle performance data to evaluate performance of the vehicle during vehicle operation.

12. The method of claim 1, where transmitting is performed when the vehicle operation stops at least temporarily after reaching the minimum distance.

13. The method of claim 1, where transmitting is performed when the vehicle operation first stops at least temporarily after reaching the minimum distance.

14. A wireless mobile computing device having capabilities for acquiring vehicle performance data and related information, the mobile device comprising:
  a processor;
  a memory storage device in operable communication with the processor;
  a display screen;
  a software application comprising computer-readable instructions stored on the memory storage device and configured for execution by said processor, the software application instructions comprising:
    acquiring instructions for acquiring vehicle performance data during operation of a vehicle using the wireless mobile computing device operably mounted to the vehicle, the vehicle performance data representing any desired information useful for evaluating the performance of the vehicle where the wireless mobile computing device is in operable communication with a camera mounted to the vehicle, such that the vehicle performance data to be acquired includes image data captured with the camera that represents an image of an operating surface upon which the vehicle operates and the acquiring instructions for acquiring vehicle performance data includes capturing the image data;
    storing instructions for storing the vehicle performance data acquired in the preceding step on a memory storage device;
    displaying instructions for displaying a representation of the vehicle performance data on a display screen of the wireless mobile computing device;
    transmitting instructions for transmitting automatically the vehicle performance data wirelessly to a remote memory storage device after the vehicle has travelled a minimum distance during vehicle operation.

15. The wireless mobile computing device of claim 14, where transmitting instructions are executed such that transmitting automatically occurs after instructing the wireless mobile computing device to transmit automatically the vehicle performance data wirelessly to the remote memory storage device.

16. The wireless mobile computing device of claim 14, where the acquiring, storing, and transmitting instructions are repeatedly performed at regular, predefined intervals.

17. A non-transitory computer-readable medium having computer-executable instructions recorded thereon, said computer-readable instructions capable of being executed by a processing element of a mobile device and providing capabilities for acquiring vehicle performance data and related information using the mobile device, the instructions comprising:
  acquiring instructions for acquiring vehicle performance data during operation of a vehicle using a wireless mobile computing device operably mounted to the vehicle, the vehicle performance data representing any desired information useful for evaluating the performance of the vehicle where the wireless mobile computing device is in operable communication with a camera mounted to the vehicle, such that the vehicle performance data to be acquired includes image data captured with the camera that represents an image of an operating surface upon which the vehicle operates and the acquiring instructions for acquiring vehicle performance data includes capturing the image data;
  storing instructions for storing the vehicle performance data acquired in the preceding step on a memory storage device;
  displaying instructions for displaying a representation of the vehicle performance data on a display screen of the wireless mobile computing device;
  transmitting instructions for transmitting automatically the vehicle performance data wirelessly to a remote memory storage device after the vehicle has travelled a minimum distance during vehicle operation.

* * * * *